United States Patent
Arai

(10) Patent No.: US 11,007,820 B2
(45) Date of Patent: May 18, 2021

(54) TIRE

(71) Applicant: Sumitomo Rubber Industries, Ltd., Kobe (JP)

(72) Inventor: Hiroshi Arai, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 191 days.

(21) Appl. No.: 15/673,542

(22) Filed: Aug. 10, 2017

(65) Prior Publication Data

US 2018/0056726 A1    Mar. 1, 2018

(30) Foreign Application Priority Data

Aug. 31, 2016   (JP) .............................. JP2016-169907

(51) Int. Cl.
  *B60C 11/03*     (2006.01)
  *B60C 11/12*     (2006.01)

(52) U.S. Cl.
  CPC ...... *B60C 11/0304* (2013.01); *B60C 11/0306* (2013.01); *B60C 11/1236* (2013.01);
  (Continued)

(58) Field of Classification Search
  CPC ........... B60L 1/0311; B60C 2011/0358; B60C 11/0304; B60C 11/0309; B60C 11/0306; B60C 11/0311; B60C 11/12
  See application file for complete search history.

(56) References Cited

U.S. PATENT DOCUMENTS 6,102,092 A * 8/2000 Radulescu .......... B60C 11/0309
                                                152/209.19
8,757,229 B2 * 6/2014 Knispel ............... B60C 11/0302
                                                152/209.18
(Continued)

FOREIGN PATENT DOCUMENTS

DE    102011076813 A1    12/2011
EP       0921020 A2     6/1999
(Continued)

OTHER PUBLICATIONS

English machine Translation of Heine, Stefan; "Pneumatic Vehicle Tyre"; (2004) (EP 1 529 659 A2); Retrieved from Espacenet. (Year: 2004).*

(Continued)

*Primary Examiner* — Robert C Dye
*Assistant Examiner* — Edgaredmanuel Troche
(74) *Attorney, Agent, or Firm* — Birch, Stewart, Kolasch & Birch, LLP

(57) ABSTRACT

A tire comprises a tread portion having a tire equator C and a first tread edge Te1. The tread portion is provided with a first main groove extending continuously in the tire circumferential direction and a first land region. The first main groove is provided on its axially outer groove wall with recessed portions recessed axially outwardly and arranged in the tire circumferential direction. The first land region is provided with first lateral grooves each comprising a first portion connected with the first main groove to form an opening and a second portion having a groove width smaller than the first portion and disposed axially inside thereof. At least a part of the opening of at least one of the first lateral grooves faces one of the recessed portions in the tire axial direction.

17 Claims, 5 Drawing Sheets

(52) U.S. Cl.
CPC .............. *B60C 2011/0346* (2013.01); *B60C 2011/0365* (2013.01); *B60C 2011/0383* (2013.01); *B60C 2011/1209* (2013.01); *B60C 2011/1245* (2013.01)

(56) References Cited

U.S. PATENT DOCUMENTS

| | | | | |
|---|---|---|---|---|
| 9,004,125 | B2* | 4/2015 | Hirose | B60C 11/0304 |
| | | | | 152/209.8 |
| 2001/0035244 | A1 | 11/2001 | Diensthuber et al. | |
| 2004/0069389 | A1 | 4/2004 | Ratliff, Jr. | |
| 2010/0326577 | A1* | 12/2010 | Iwai | B60C 11/0309 |
| | | | | 152/209.24 |
| 2011/0005653 | A1* | 1/2011 | Ebiko | B60C 11/12 |
| | | | | 152/209.18 |
| 2011/0308679 | A1 | 12/2011 | Hirose et al. | |
| 2012/0247632 | A1* | 10/2012 | Hayashi | B60C 11/12 |
| | | | | 152/209.22 |
| 2012/0267022 | A1* | 10/2012 | Tagashira | B60C 11/0309 |
| | | | | 152/209.25 |
| 2014/0238567 | A1* | 8/2014 | Iwasaki | B60C 11/0306 |
| | | | | 152/209.18 |
| 2014/0290817 | A1* | 10/2014 | Kawakami | B60C 11/1307 |
| | | | | 152/209.18 |

FOREIGN PATENT DOCUMENTS

| | | | | |
|---|---|---|---|---|
| EP | 1529659 | A2 * | 5/2005 | ......... B60C 11/1281 |
| EP | 1950060 | A1 | 7/2008 | |
| EP | 2048007 | A1 | 4/2009 | |
| JP | 2006298057 | A * | 11/2006 | ......... B60C 11/1281 |
| JP | 2013-151289 | A | 8/2013 | |

OTHER PUBLICATIONS

Machine English Translation of JP-2006298057-A, retrieved from Espacenet. (Year: 2006).*
Machine English Translation of EP-1529659-A2, retrieved from Espacenet. (Year: 2005).*
European Office Action, dated Nov. 15, 2018, for European Application No. 17180685.4.
Extended European Search Report, dated Jan. 10, 2018, for European Application No. 17180685.4.

* cited by examiner

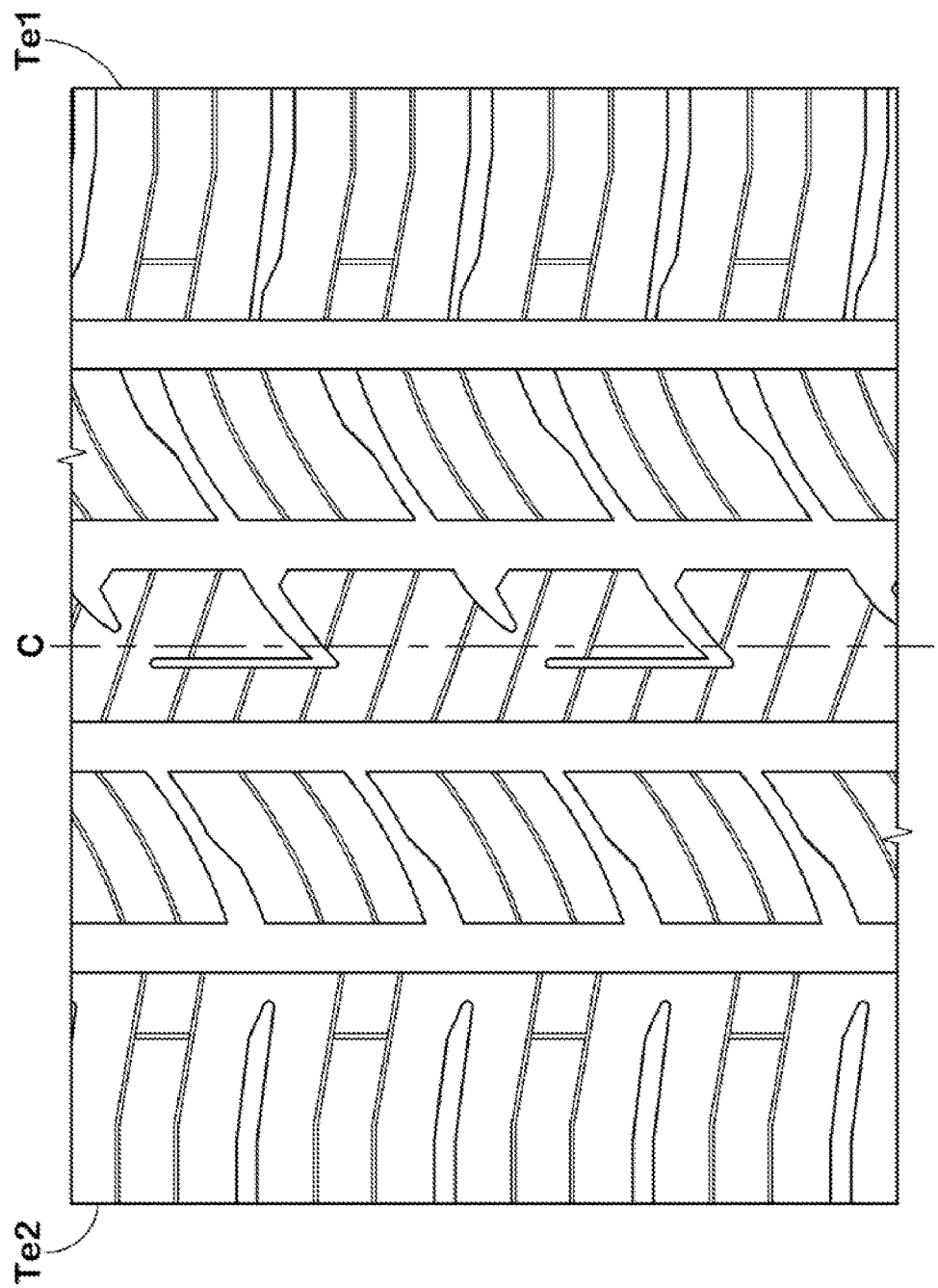

TIRE

TECHNICAL FIELD

The present invention relates to a tire capable of exerting excellent on-snow performance.

BACKGROUND ART

Japanese unexamined Patent Application Publication No. 2013-151289 (Patent Literature 1), for example, has proposed a tire having a main groove provided with a plurality of recesses in a groove wall thereof and lateral grooves connected with the main groove in order to improve the on-snow performance.

Unfortunately, the tire disclosed in Patent Literature 1 still has room for further improvement as to the on-snow performance.

SUMMARY OF THE INVENTION

The present invention was made in view of the above, and a primary object thereof is to provide a tire capable of exerting excellent on-snow performance.

In one aspect of the present invention, a tire comprises a tread portion having a tire equator and a first tread edge, the tread portion being provided with a first main groove extending continuously in a tire circumferential direction between the tire equator and the first tread edge and a first land region disposed adjacently to the first main groove on a first side in a tire axial direction, the first main groove comprising a groove wall located on a second side in the tire axial direction, the groove wall being provided with a plurality of recessed portions recessed toward the second side and arranged in the tire circumferential direction, the first land region being provided with a plurality of first lateral grooves, each of the first lateral grooves comprising a first portion connected with the first main groove so as to form an opening on the first main groove and a second portion disposed on the first side in the tire axial direction of the first portion and having a groove width smaller than that of the first portion, and at least a part of the opening of the first portion of at least one of the first lateral grooves facing one of the recessed portions in the tire axial direction.

In another aspect of the invention, it is preferred that the first land region is provided with a plurality of sipes extending along the first lateral grooves.

In another aspect of the invention, it is preferred that in a pair of the opening and one of the recessed portions facing each other, a center of the opening in the tire circumferential direction is misaligned in the tire circumferential direction with respect to a center of the one of the recessed portions in the tire circumferential direction.

In another aspect of the invention, it is preferred that each of the first portion and the second portion extends with a constant groove width, and a middle portion having a groove width gradually increasing toward the first portion is provided between the first portion and the second portion.

In another aspect of the invention, it is preferred that the first land region is adjacent to an inner side in the tire axial direction of the first main groove, the tread portion is provided with a second land region adjacent to the first main groove on an outer side in the tire axial direction, and the second land region is provided with a pair of lateral sipes extending axially outwardly from any one of the recessed portions and a longitudinal sipe connecting between the pair of the lateral sipes.

In another aspect of the invention, it is preferred that the first land region is adjacent to the first main groove on the inner side in the tire axial direction, the tread portion is provided with a second main groove extending continuously in the tire circumferential direction between the first main groove and the tire equator and defining the first land region between the first main groove and the second main groove, and a third land region adjacent to the second main groove on the inner side in the tire axial direction, each of the first lateral grooves is connected with the second main groove, the third land region is provided with a plurality of lug grooves extending axially inwardly from the second main groove and terminating within the third land region, and at least one of the lug grooves is provided on one of extended lines obtained by virtually extending the first lateral grooves axially inwardly according to shapes thereof.

In another aspect of the invention, it is preferred that the lug grooves includes first lug grooves and second lug grooves having lengths larger than those of the first lug grooves, and the first lug grooves and the second lug grooves are arranged alternately in the tire circumferential direction.

BRIEF DESCRIPTION OF THE DRAWINGS

FIG. 5 is a development view of the tread portion of Reference.

DESCRIPTION OF THE PREFERRED EMBODIMENT

An embodiment of the present invention will now be described in conjunction with accompanying drawings.

Figure 1:
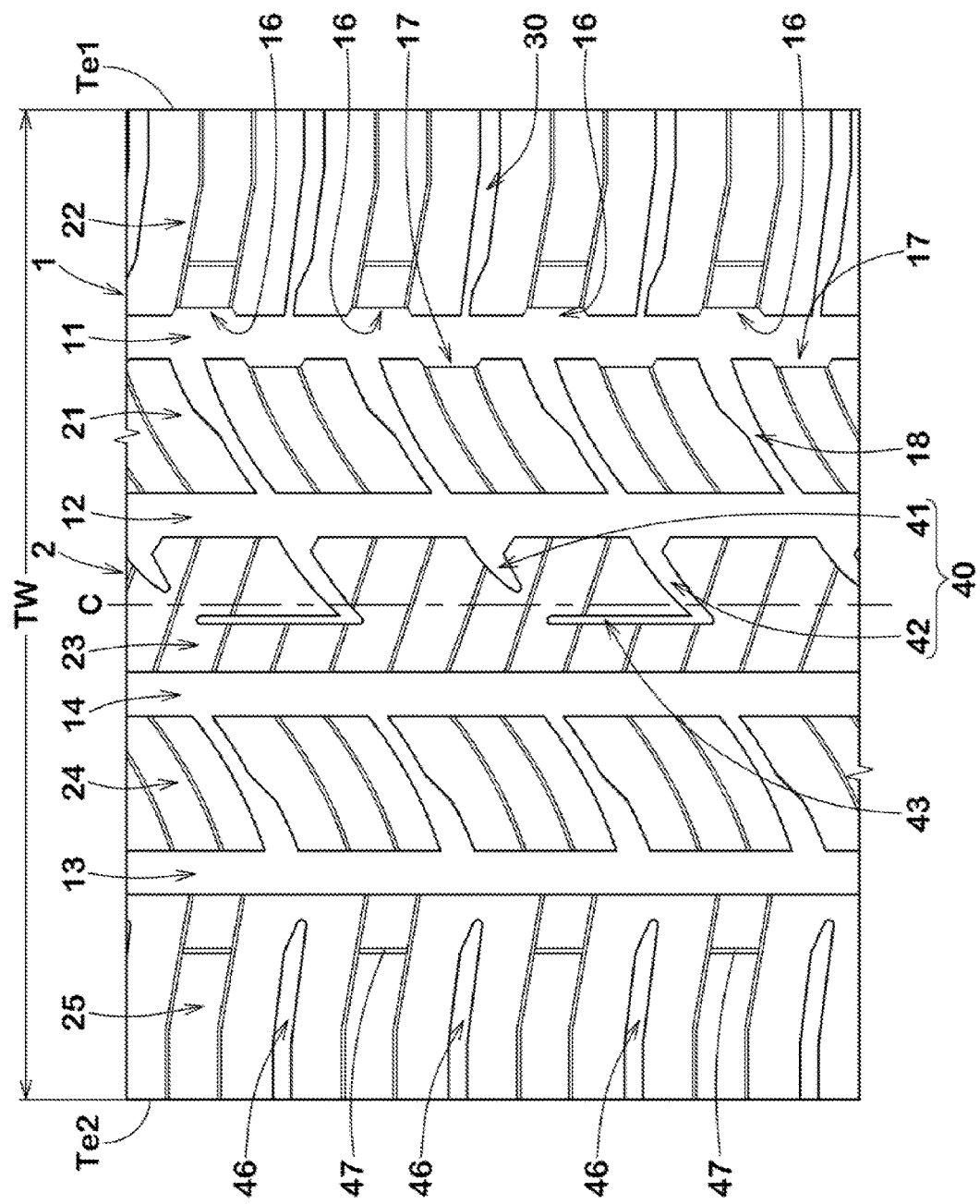
FIG. 1 is a development view of a tread portion of a tire as an embodiment of the present invention.

FIG. 1 is a development view of a tread portion 2 of a tire 1 as an embodiment of the present invention. The tire 1 in this embodiment can be used for various tires such as a pneumatic tire for a passenger car and for heavy duty and a non-pneumatic tire not filled with pressurized air, for example. The tire 1 in this embodiment is suitably used as a winter tire for a passenger car, for example.

As shown in FIG. 1, the tread portion 2 is provided with a first tread edge Te1 and a second tread edge Te2. In a case of a pneumatic tire, the first tread edge Te1 and the second tread edge Te2 are both ground contacting edges of the tire 1 in the tire axial direction when the tire 1 in a standard state is in contact with a flat surface with zero camber angle by being loaded with a standard load. The standard state is a state in which the tire is mounted on a standard rim and inflated to a standard pressure with no tire load. Sizes and the like of various parts of the tire in this specification are those measured in the standard state unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 is provided with a plurality of main grooves continuously extending in the tire circumferential direction. The plurality of the main grooves include a first main groove 11 and a second main groove 12 provided between a tire equator C and the first tread edge Te1, and a third main groove 13 and a fourth main groove 14 provided between the tire equator C and the second tread edge Te2.

The first main groove 11 is provided closest to the first tread edge Te1 among the main grooves 11 to 14, for example. The second main groove 12 is provided between the first main groove 11 and the tire equator C, for example. The third main groove 13 is provided closest to the second tread edge Te2 among the main grooves 11 to 14, for example. The fourth main groove 14 is provided between the third main groove 13 and the tire equator C, for example.

It is preferred that a distance in the tire axial direction between the tire equator C and a groove center line of the first main groove 11 and a distance in the tire axial direction between the tire equator C and a groove center line of the third main groove 13 are each in a range of from 0.20 to 0.35 times a tread width TW, for example. It is preferred that a distance in the tire axial direction between the tire equator C and a groove center line of the second main groove 12 and a distance in the tire axial direction between the tire equator C and a groove center line of the fourth main groove 14 are each in a range of from 0.08 to 0.15 times the tread width TW, for example. The tread width TW is a distance in the tire axial direction between the first tread edge Te1 and the second tread edge Te2 in the standard state.

It is preferred that a groove width of each of the main grooves 11 to 14 is in a range of from 3% to 7% of the tread width TW, for example. In the case of a tire for a passenger car, it is preferred that a groove depth of each of the main grooves 11 to 14 is about 5 to 10 mm, for example. However, the dimensions of the main grooves 11 to 14 are not limited to such ranges.

By providing the main grooves 11 to 14, the tread portion 2 is at least provided with a first land region 21 adjacent to the first main groove 11 on a first side in the tire axial direction. The first land region 21 may be adjacent to the first main groove 11 either on the inside or outside thereof in the tire axial direction. As a preferred embodiment, the first land region 21 in this embodiment is adjacent to the first main groove 11 on the inside thereof in the tire axial direction. Further, the first land region 21 in this embodiment is defined between the first main groove 11 and the second main groove 12.

Figure 2:
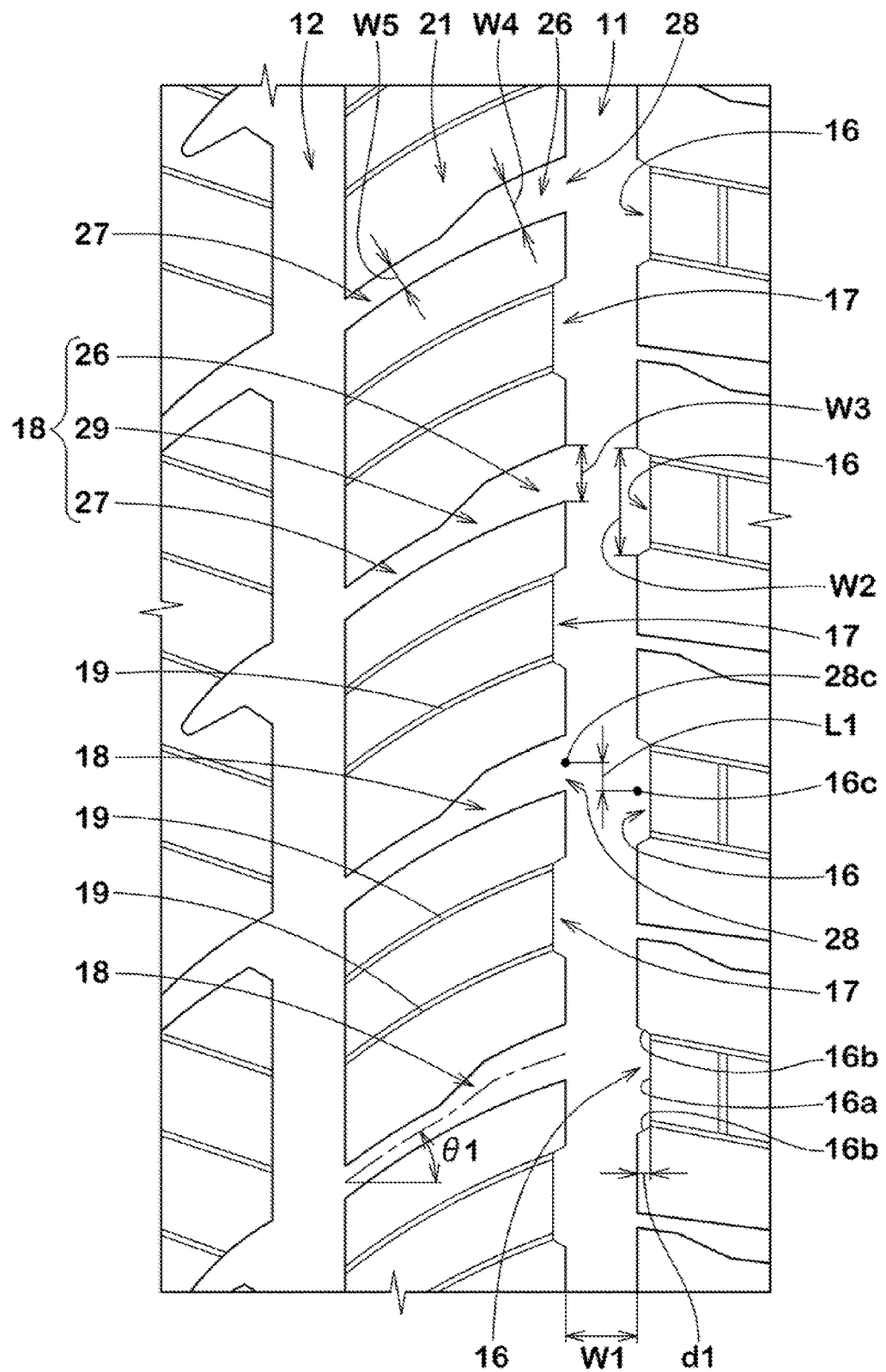
FIG. 2 is an enlarged view of a first main groove and a first land region of FIG. 1.

An enlarged view of the first main groove 11 and the first land region 21 is shown in FIG. 2. As shown in FIG. 2, the first main groove 11 is provided in a groove wall thereof on a second side (axially outside in this embodiment) with a plurality of recessed portions 16 recessed to the second side and arranged in the tire circumferential direction. The first main groove 11 having the recessed portions 16 can capture more snow in the groove when running on a snowy road and consequently large snow shearing force is obtained.

The recessed portions 16 in this embodiment are, for example, in plan view, recessed in a substantially quadrangular shape from a groove wall main body extending in the tire circumferential direction. More specifically, the recessed portions 16 each include a first face 16a extending along the tire circumferential direction and a pair of second faces 16b extending from both ends in the tire circumferential direction of the first face 16a toward the groove center line of the first main groove 11. In a preferred embodiment, the pair of the second faces 16b extends obliquely such that they get away from each other and a distance therebetween in the tire circumferential direction increases toward the groove center line, for example, therefore, it is possible that the recessed portions 16 are formed in a substantially trapezoidal shape.

As a preferred embodiment, the groove wall of the first main groove 11 on a side of the first land region 21 (axially inside in this embodiment) is provided with recessed portions 17. The recessed portions 17 also have the same shape as the recessed portions 16 described above. In this embodiment, the recessed portions 16 provided in the groove wall on the axially outside and the recessed portions 17 provided in the groove wall on the axially inside are arranged alternately in the tire circumferential direction. The first main groove 11 having the recessed portions 17 configured as such can take in more snow therein.

It is preferred that lengths W2 of the recessed portions 16 and 17 in the tire circumferential direction are in a range of from 1.0 to 1.5 times a groove width w1 of the first main groove 11, for example. It is preferred that widths d1 of the recessed portions 16 and 17 in the tire axial direction are in a range of from 0.10 to 0.20 times the groove width w1, for example.

Note that, as shown in FIG. 1, the second main groove 12, the third main groove 13, and the fourth main groove 14 in this embodiment are not provided with the above-described recessed portions, for example. Thereby, the second main groove 12, the third main groove 13, and the fourth main groove 14 in this embodiment are formed only with smooth groove walls extending along the tire circumferential direction.

As shown in FIG. 2, the first land region 21 is provided with a plurality of first lateral grooves 18.

Each of the first lateral grooves 18 is provided, for example, between adjacent pair of a plurality of the recessed portions 17 provided in the groove wall of the first main groove 11 on the axially inside. In other words, the first lateral grooves 18 and the recessed portions 17 are arranged alternately in the tire circumferential direction.

The first lateral grooves 18 extend obliquely, for example, across the first land region 21. It is preferred that an angle θ1 of the first lateral grooves 18 with respect to the tire axial direction is in a range of from 20 to 40 degrees, for example.

Each of the first lateral grooves 18 includes a first portion 26 connected with the first main groove 11 and a second portion 27 disposed on the first side in the tire axial direction of the first portion 26 and having a groove width smaller than that of the first portion 26. The second portions 27 of the first lateral grooves 18 in this embodiment are each connected with the second main groove 12, for example. The first lateral grooves 18 can strongly compress the snow therein while moving it toward the first main groove 11 during running on a snowy road.

Each of the first portions 26 includes an opening 28 which is a connection portion with the first main groove 11, and at least a part of the opening 28 of the first portion 26 of at least one of the first lateral grooves 18 faces one of the recessed portions 16 in the tire axial direction. That is, when the opening 28 is virtually extended toward one of the recessed portions 16 along the tire axial direction, at least a part thereof overlaps with the recessed portion 16. As a further preferred embodiment, each of the openings 28 of the first lateral grooves 18 in this embodiment faces its corresponding recessed portions 16.

When running on a snowy road, snow in the first lateral grooves 18 moves toward the first main groove 11. This snow strongly presses snow in the recessed portions 16 facing the first lateral grooves 18. Thereby, harder snow blocks are formed in the recessed portions 16, therefore, it is possible that large snow shearing force is obtained.

Generally, when a tire contacts with a road surface, large ground contact pressure is applied to a part of the tire around the tire equator. Thereby, snow in lateral grooves tends to move axially outwardly during running on a snowy road. Therefore, it is preferred that, as in this embodiment, the first land region 21 is provided adjacently to the first main groove 11 on the inner side thereof in the tire axial direction, and the recessed portions 16 are provided outside the first lateral grooves 18 in the tire axial direction. In such an embodiment, snow in the first lateral grooves 18 moves toward the recessed portions 16 during running on a snowy road, therefore, harder snow blocks are formed.

It is preferred that widths W3 of the openings 28 are smaller than the lengths W2 of the recessed portions 16, for example. Specifically, it is preferred that the widths W3 of the openings 28 are in a range of from 0.45 to 0.65 times the lengths W2 of the recessed portions 16. Thereby, it is possible that the on-snow performance is further improved while uneven wear of the first land region 21 on the axially outer side is suppressed.

It is preferred that each of the openings 28 of the first portions 26 faces corresponding one of the recessed portions 16 with not less than 50%, more preferably not less 80%, of the width W3. Thereby, snow in the recessed portions 16 is sufficiently compressed.

It is preferred that a center 28$c$ in the tire circumferential direction of the opening 28 of the first portion 26 is misaligned in the tire circumferential direction with respect to a center 16$c$ in the tire circumferential direction of the corresponding recessed portion 16. If both of the centers 28$c$ and 16$c$ are in the same position (i.e. aligned) in the tire circumferential direction, it is possible that large pumping sound is generated at a connection portion between the first main groove 11 and the first lateral groove 18 during running on a dry road. In order to improve the on-snow performance and noise performance in a good balance, it is possible that a positional deviation amount L1 in the tire circumferential direction between the center 28$c$ of the opening 28 and the center 16$c$ of the recessed portion 16 is preferably not less than 0.5 mm, more preferably not less than 1.5 mm, and preferably not greater than 3.5 mm, more preferably not greater than 2.5 mm.

The first portions 26 and the second portions 27 of the first lateral grooves 18 in this embodiment each extend with a constant groove width. Further, in each of the first lateral groves 18, a middle portion 29 having a groove width gradually increasing toward the first portion 26 is provided between the first portion 26 and the second portion 27. The first lateral grooves 18 configured as such can obtain the above-mentioned effect while improving wear resistance of the first land region 21.

In order to improve the on-snow performance and the wear resistance in a good balance, a ratio W5/W4 of groove widths w5 of the second portions 27 and groove widths W4 of the first portions 26 is preferably not less than 0.50, more preferably not less than 0.65, and preferably not greater than 0.90, more preferably not greater than 0.75.

It is preferred that the first land region 21 in this embodiment is provided with a plurality of sipes 19 extending along the first lateral grooves 18, for example. The sipes 19 configured as such moderately decrease rigidity of the first land region 21, therefore, snow in the first lateral grooves 18 is compressed even more strongly when running on a snowy road. In this specification, the term "sipe" means a cut having a width smaller than 1.5 mm, and it is distinguished from a groove for draining water.

In this embodiment, a pair of the sipes 19 is provided between each pair of the first lateral grooves 18 adjacent in the tire circumferential direction. It is preferred that the two sipes 19 are connected with one of the recessed portions 17, for example. Thereby, the rigidity of the first land region 21 is moderated, therefore, it is possible that discharge of snow in the recessed portions 17 is promoted.

As shown in FIG. 1, the tread portion 2 is further provided with a second land region 22, a third land region 23, a fourth land region 24, and a fifth land region 25. The second land region 22 is defined between the first main groove 11 and the first tread edge Te1. The third land region 23 is defined between the second main groove 12 and the fourth main groove 14. The fourth land region 24 is defined between the third main groove 13 and the fourth main groove 14. The fifth land region 25 is defined between the third main groove 13 and the second tread edge Te2.

Figure 3:
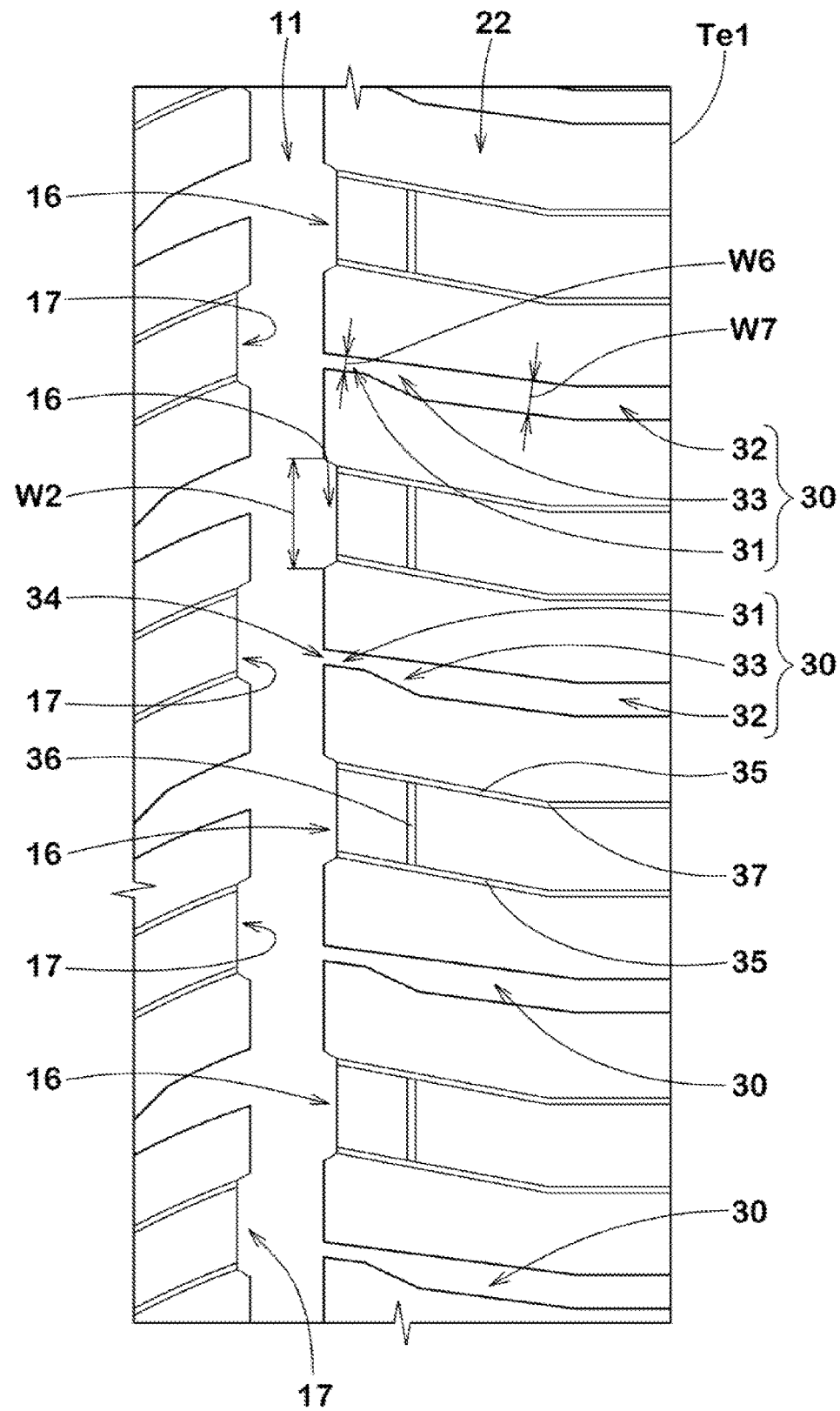
FIG. 3 is an enlarged view of a second land region of FIG. 1.

An enlarged view of the second land region 22 is shown in FIG. 3. As shown in FIG. 3, it is preferred that the second land region 22 is provided with a plurality of second lateral grooves 30 extending from the first main groove 11 to the first tread edge Te1, for example.

Each of the second lateral grooves 30 is connected with the first main groove 11, for example, between each adjacent pair of the plurality of the recessed portions 16 provided in the first main groove 11 on the axially outer side. In other words, the second lateral grooves 30 and the recessed portions 16 are provided alternately in the tire circumferential direction.

It is preferred that each of the second lateral grooves 30 includes a narrow portion 31 connected with the first main groove 11, a wide portion 32 disposed on the axially outer side of the narrow portion 31 and having a larger groove width than that of the narrow portion 31, and an middle portion 33 disposed between the narrow portion 31 and the wide portion 32. The second lateral grooves 30 configured as such can improve the on-snow performance while maintaining rigidity of an axially inner part of the second land region 22.

It is preferred that groove widths W6 of the narrow portions 31 are in a range of from 0.10 to 0.15 times the lengths w2 of the recessed portions 16 in the tire circumferential direction, for example. It is preferred that groove widths w7 of the wide portions 32 are in a range of from 2.0 to 3.0 times the groove widths W6 of the narrow portions 31, for example.

The narrow portion 31 of each of the second lateral grooves 30 includes an opening 34 open to the first main groove 11. It is preferred that at least a part of the opening 34 of at least one of the second lateral grooves 30 faces one of the recessed portions 17 in the tire axial direction. Thereby, snow in the recessed portions 17 is easily discharged.

It is preferred that the second land region 22 is provided with a pair of lateral sipes 35 extending axially outwardly from any one of, from each of in this embodiment, the recessed portions 16 and a longitudinal sipe 36 connecting between the pair of the lateral sipes 35, for example. Thereby, a block piece between the recessed portion 16 and the longitudinal sipe 36 deforms moderately, therefore, it is possible that clogging of snow in the first main groove 11 is suppressed during running on a snowy road.

Each of the lateral sipes 35 extends, for example, along the second lateral grooves 30 and includes a partially bent portion 37.

The longitudinal sipes 36 are provided axially outside the narrow portions 31 of the second lateral grooves 30, for example. The longitudinal sipes 36 are provided axially inside the bent portions 37 of the lateral sipes 35, for example. Such arrangement of the longitudinal sipes 36 can exert the above-mentioned effect while maintaining the wear resistance of the second land region 22.

Figure 4:
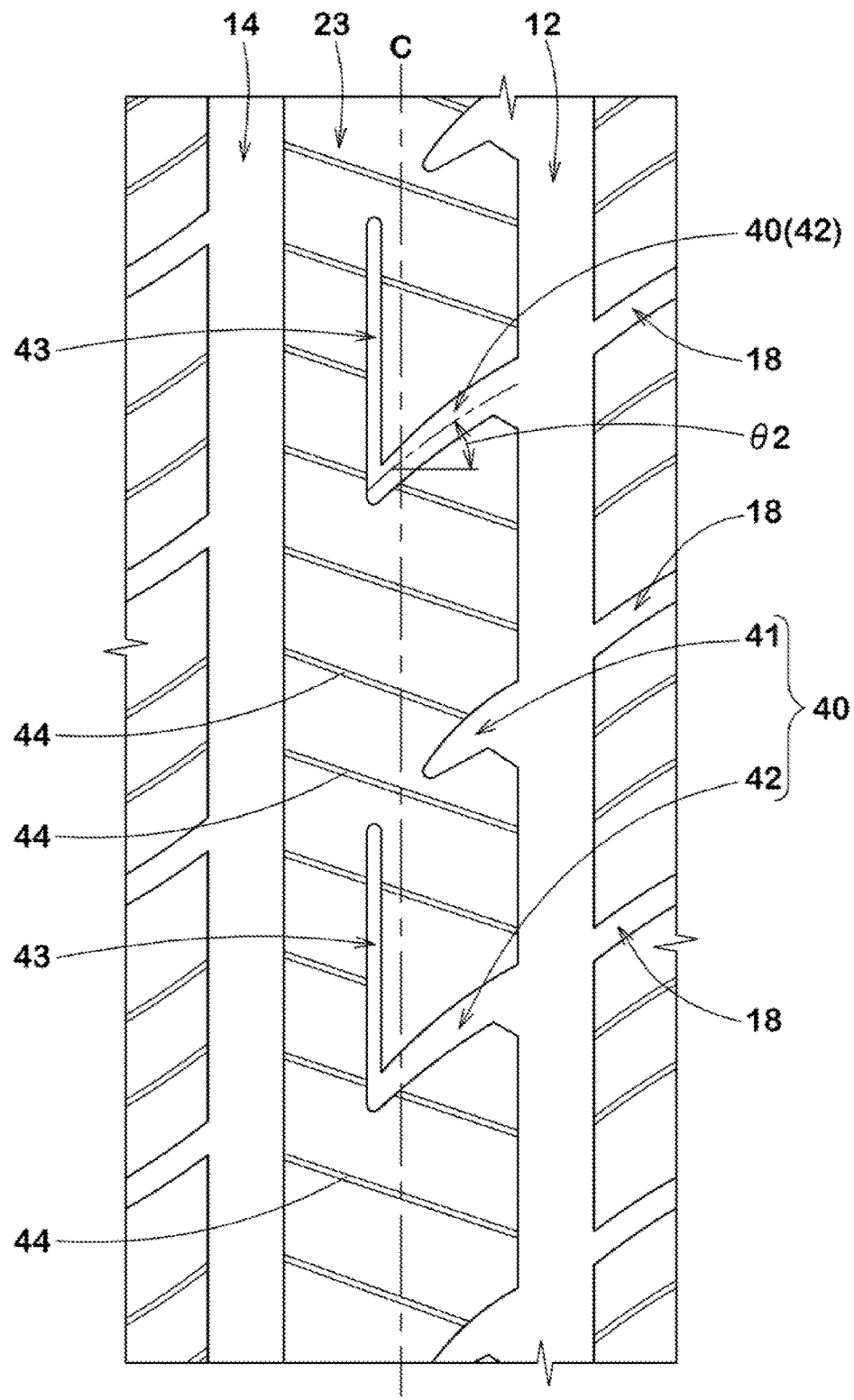
FIG. 4 is an enlarged view of a third land region of FIG. 1.

In FIG. 4, an enlarged view of the third land region 23 is shown. As shown in FIG. 4, it is preferred that the third land region 23 is provided with a plurality of lug grooves 40 extending axially inwardly from the second main groove 12 and terminating within the third land region 23, for example.

It is preferred that each of the lug grooves 40 is inclined to a same direction as the first lateral grooves 18 provided in the first land region 21, for example. It is preferred that an angle θ2 of the lug grooves 40 with respect to the tire axial direction is in a range of from 35 to 55 degrees, for example.

It is preferred that at least one of the lug grooves 40 is provided on one of extended lines obtained by virtually extending the first lateral grooves 18 axially inwardly according to its shape. As a further preferred embodiment, each of the lug grooves 40 in this embodiment is provided on one of the extended lines. The lug grooves 40 configured as such, along with the first lateral grooves 18, form snow blocks extending in the tire axial direction, therefore, it is possible that traction on a snowy road is improved.

It is preferred that each of the lug grooves 40 has a groove width gradually decreasing toward its inner end portion terminating within the third land region 23. The lug grooves 40 configured as such help to maintain rigidity of the third land region 23.

It is preferred that the lug grooves 40 include first lug grooves 41 and second lug grooves 42 longer than the first lug grooves 41, for example. The first lug grooves 41 terminate before reaching the tire equator C, for example. The second lug grooves 42 cross the tire equator C, for example. The first lug grooves 41 and the second lug grooves 42 in this embodiment are arranged alternately in the tire circumferential direction. Thereby, it is possible that the pumping sound generated in each of the first lug grooves 41 and the second lug grooves 42 is converted into white noise.

It is preferred that at least one, each in this embodiment, of the second lug grooves 42 is provided with a longitudinal auxiliary groove 43 connected with the inner end portion of the second lug groove 42 and extending along the tire circumferential direction, for example. The longitudinal auxiliary groove 43 configured as such forms a snow block extending in the tire circumferential direction when running on a snowy road, and therefore helps to improve cornering performance on a snowy road.

The third land region 23 is provided with a plurality of sipes 44 crossing the third land region 23 so as to connect between the second main groove 12 and the fourth main groove 14, for example. The sipes 44 in this embodiment are inclined to the opposite direction to the lug grooves 40, for example. The third land region 23 is provided with the lug grooves 40 and the sipes 44 inclined to the different directions from each other, which makes it easy for the third land region 23 to deform moderately, therefore, it is possible that clogging of snow in the second main groove 12 and the fourth main groove 14 is prevented effectively.

As shown in FIG. 1, the fourth land region 24 and the fifth land region 25 have the same configuration as the first land region 21 and the second land region 22 except for the differences described below.

The fourth land region 24 and the fifth land region 25 are divided by the third main groove 13 whose groove walls are not provided with the above-described recessed portions, therefore, side faces extending smoothly in the tire circumferential direction are formed on a side of the third main groove 13 of each of the fourth land region 24 and the fifth land region 25.

The fifth land region 25 is provided with lug grooves 46 extending axially inwardly from the second tread edge Te2 and terminating within the fifth land region 25. The lug grooves 46 terminate axially inside longitudinal sipes 47, for example. The lug grooves 46 configured as such maintain rigidity of the fifth land region 25, and therefore help to improve steering stability.

As described above, in this embodiment, the recessed portions 16 are provided only in the first main groove 11 adjacent to the tread edge Te1 located on the first side among the four main grooves provided in the tread portion 2. However, the present invention is not limited to such an embodiment, and the first main groove 11 provided with the recessed portions 16 may be provided at positions other than the above.

Also, in the case of the tire 1 having a specified mounting direction to a vehicle, it is preferred that the first main groove 11 provided with the recessed portions 16 is disposed adjacently to one of the tread edges positioned axially inside when mounted on the vehicle. Thereby, large ground contact pressure is applied to the first main groove 11, therefore, it is possible that hard snow blocks are formed.

While detailed description has been made of the tire as an embodiment of the present invention, the present invention can be embodied in various forms without being limited to the illustrated embodiment.

Working Example (Example)

Tires of size 225/65R17 having a basic pattern shown in FIG. 1 were made by way of test according to the specification listed in Table 1. As a reference, as shown in FIG. 5, a tire having no recessed portion in groove walls of all main grooves was made by way of test. The on-snow performance and the noise performance were tested for each of the test tires. Common specifications and test methods of each of the test tires are as follows.

Rim: 17×6.5J
Tire pressure: 220 kPa
Test car: 4WD car with displacement of 2400 cc
Test tire mounting position: all wheels
Groove width W1 of first main groove: 5.0% of tread width TW
Lengths W2 of recessed portions in the tire circumferential direction: 1.25 times the groove width W1
<On-Snow Performance>
A distance needed for accelerating the above test car from 5 km/h to 20 km/h on a snowy road was measured by GPS and an average acceleration was calculated. The results are indicted by an index based on the average acceleration of the reference being 100, wherein the larger the numerical value, the better the on-snow performance is.

<Noise Performance>

In-car noise was measured while driving the test car on a dry road surface at a speed of 100 km/h. The results are indicated by an index based on the value of the reference being 100, wherein the smaller the numerical value, the smaller the in-car noise, which is better.

The test results are shown in Table 1.

TABLE 1

(1/2)

|  | Ref. | Ex. 1 | Ex. 2 | Ex. 3 | Ex. 4 | Ex. 5 | Ex. 6 |
|---|---|---|---|---|---|---|---|
| FIGURE showing Tread pattern | FIG. 5 | FIG. 1 | FIG. 1 | FIG. 1 | FIG. 1 | FIG. 1 | FIG. 1 |
| Axial widths d1 of Recessed portions/Groove width W1 of First main groove | — | 0.15 | 0.10 | 0.13 | 0.17 | 0.20 | 0.15 |
| Positional deviation amount L1 between Center of Recessed portion and Center of Opening [mm] | — | 2.0 | 2.0 | 2.0 | 2.0 | 2.0 | 0.5 |
| Groove widths W5 of Second portions/Groove widths W4 of First portions | 0.70 | 0.70 | 0.70 | 0.70 | 0.70 | 0.70 | 0.70 |
| On-snow performance [index] | 100 | 107 | 104 | 106 | 107 | 108 | 107 |
| Noise performance [index] | 100 | 99 | 98 | 99 | 100 | 102 | 101 |

(2/2)

|  | Ex. 7 | Ex. 8 | Ex. 9 | Ex. 10 | Ex. 11 | Ex. 12 | Ex. 13 |
|---|---|---|---|---|---|---|---|
| FIGURE showing Tread pattern | FIG. 1 | FIG. 1 | FIG. 1 | FIG. 1 | FIG. 1 | FIG. 1 | FIG. 1 |
| Axial widths d1 of Recessed portions/Groove width W1 of First main groove | 0.15 | 0.15 | 0.15 | 0.15 | 0.15 | 0.15 | 0.15 |
| Positional deviation amount L1 between Center of Recessed portion and Center of Opening [mm] | 1.5 | 2.5 | 3.5 | 2.0 | 2.0 | 2.0 | 2.0 |
| Groove widths W5 of Second portions/Groove widths W4 of First portions | 0.70 | 0.70 | 0.70 | 0.50 | 0.65 | 0.75 | 0.90 |
| On-snow performance [index] | 107 | 106 | 105 | 106 | 106 | 107 | 106 |
| Noise performance [index] | 100 | 99 | 98 | 100 | 99 | 99 | 100 |

From the test results, it was confirmed that the tires as the examples exerted excellent on-snow performance. Further, it was confirmed that the noise performance of the tires as the examples was maintained.

The invention claimed is:

1. A tire comprising:
   a tread portion having a tire equator and a first tread edge, the tread portion being provided with a first main groove extending continuously in a tire circumferential direction between the tire equator and the first tread edge and a first land region disposed adjacently to the first main groove on a first side in a tire axial direction farther away from the first tread edge;
   the tread portion also being provided with a second main groove extending continuously in the tire circumferential direction between the first main groove and the tire equator and defining the first land region between the first main groove and the second main groove, and a third land region adjacent to the second main groove on the inner side in the tire axial direction;
   the first main groove comprising a first groove wall located on a second side in the tire axial direction closer to the first tread edge and a second groove wall located on the first side, the first groove wall being provided with a plurality of first recessed portions recessed toward the second side and arranged in the tire circumferential direction, the second groove wall being provided with a plurality of second recessed portions recessed toward the first side and arranged in the tire circumferential direction;
   the first land region being provided with a plurality of first lateral grooves; and
   the first land region being adjacent to the first main groove on the inner side in the tire axial direction;
   wherein
   each of the first lateral grooves comprises a first portion connected with the first main groove so as to form an opening on the first main groove and a second portion disposed on the first side in the tire axial direction of the first portion and having a groove width smaller than that of the first portion;
   at least a part of the opening of the first portion of at least one of the first lateral grooves faces one of the first recessed portions in the tire axial direction, and if the opening is virtually extended toward the first recessed portion along the tire axial direction, at least a part thereof overlaps with the first recessed portion;
   the second recessed portions are not connected with the first lateral grooves;
   the first land region is provided with a plurality of sipes extending along the first lateral grooves, wherein each of the sipes extends in an arc shape over its entire length;
   each of the first lateral grooves is connected with the second main groove;
   the third land region is provided with a plurality of lug grooves extending axially inwardly from the second main groove and terminating within the third land region to each have a closed terminating end;

at least one of the lug grooves is provided on one of extended lines obtained by virtually extending the first lateral grooves axially inwardly according to shapes of the first lateral grooves;

the lug grooves include first lug grooves and second lug grooves having lengths larger than those of the first lug grooves;

the first lug grooves and the second lug grooves are arranged alternately in the tire circumferential direction; and the first lug grooves are not connected with the second lug grooves.

2. The tire according to claim 1, wherein in a pair of the opening and one of the first recessed portions facing each other, a center of the opening in the tire circumferential direction is misaligned in the tire circumferential direction with respect to a center of the one of the first recessed portions in the tire circumferential direction, a circumferential width of the opening is smaller than a circumferential length of the one of the first recessed portions, and a groove width of the first main groove is in a range of from 3% to 7% of a tread width.

3. The tire according to claim 2, wherein a distance in the tire circumferential direction between the center of the opening and the center of the one of the first recessed portions is not less than 0.5 mm and not greater than 3.5 mm.

4. The tire according to claim 1, wherein each of the first portion and the second portion extends with a constant groove width, and a middle portion having a groove width gradually increasing toward the first portion is provided between the first portion and the second portion.

5. The tire according to claim 1, wherein the first land region is adjacent to an inner side in the tire axial direction of the first main groove, the tread portion is provided with a second land region adjacent to the first main groove on an outer side in the tire axial direction, the second land region is provided with a pair of lateral sipes extending axially outwardly from any one of the first recessed portions and a longitudinal sipe connecting between the pair of the lateral sipes, and the longitudinal sipe does not extend beyond a region between the pair of the lateral sipes.

6. The tire according to claim 5, wherein the second land region is provided with a plurality of second lateral grooves extending from the first main groove to the first tread edge and blocks divided by the second lateral grooves, each of the blocks includes only a pair of the lateral sipes and only one longitudinal sipe, the second land region is defined between the first main groove and the first tread edge, each of the second lateral grooves extends so as to connect the first main groove and the first tread edge, and the longitudinal sipe is not connected with the second lateral grooves.

7. The tire according to claim 6, wherein the second lateral grooves and the first recessed portions are provided alternately in the tire circumferential direction.

8. The tire according to claim 6, wherein each of the second lateral grooves includes a narrow portion connected with the first main groove, a wide portion disposed on the axially outer side of the narrow portion and having a larger groove width than that of the narrow portion, and an middle portion disposed between the narrow portion and the wide portion, and the longitudinal sipe is provided on the axially outer side of the narrow portion, and in each of the second lateral grooves, one of groove walls extends linearly over the narrow portion and the middle portion.

9. The tire according to claim 1, wherein each of the first recessed portions includes a first face extending along the tire circumferential direction and a pair of second faces extending from both ends in the tire circumferential direction of the first face toward a groove center line of the first main groove.

10. The tire according to claim 1, wherein the sipes extend the entire length thereof in parallel with at least one of groove walls of the first lateral grooves.

11. The tire according to claim 1, wherein the first lateral grooves are inclined with respect to the tire axial direction, and the sipes are inclined in the same direction as the first lateral grooves with respect to the tire axial direction.

12. The tire according to claim 1, wherein a pair of the sipes is provided between each pair of the first lateral grooves and is connected with one of the second recessed portions.

13. The tire according to claim 1, wherein the first lug grooves terminate before reaching the tire equator.

14. The tire according to claim 1, wherein the second lug grooves cross the tire equator.

15. The tire according to claim 1, wherein at least one of the second lug grooves is provided with a longitudinal auxiliary groove connected with an inner end portion of the at least one of the second lug grooves and extending along the tire circumferential direction, and the longitudinal auxiliary groove extends in parallel with the tire circumferential direction.

16. A tire comprising:

a tread portion having a tire equator and a first tread edge, the tread portion being provided with a first main groove extending continuously in a tire circumferential direction between the tire equator and the first tread edge and a first land region disposed adjacently to the first main groove on a first side in a tire axial direction farther away from the first tread edge;

the first main groove comprising a first groove wall located on a second side in the tire axial direction closer to the first tread edge and a second groove wall located on the first side, the first groove wall being provided with a plurality of first recessed portions recessed toward the second side and arranged in the tire circumferential direction, the second groove wall being provided with a plurality of second recessed portions recessed toward the first side and arranged in the tire circumferential direction; and the first land region being provided with a plurality of first lateral grooves;

wherein each of the first lateral grooves comprises a first portion connected with the first main groove so as to form an opening on the first main groove and a second portion disposed on the first side in the tire axial direction of the first portion and having a groove width smaller than that of the first portion;

at least a part of the opening of the first portion of at least one of the first lateral grooves faces one of the first recessed portions in the tire axial direction, and if the opening is virtually extended toward the first recessed portion along the tire axial direction, at least a part thereof overlaps with the first recessed portion;

the second recessed portions are not connected with the first lateral grooves;

the first land region is provided with a plurality of sipes extending along the first lateral grooves wherein each of the sipes extends in an arc shape over its entire length;

the first land region is adjacent to an inner side in the tire axial direction of the first main groove;

the tread portion is provided with a second land region adjacent to the first main groove on an outer side in the tire axial direction;

the second land region is provided with a pair of lateral sipes extending axially outwardly from any one of the first recessed portions and a longitudinal sipe connecting between the pair of the lateral sipes;

the longitudinal sipe does not extend beyond a region between the pair of the lateral sipes;

the second land region is provided with a plurality of second lateral grooves extending from the first main groove to the first tread edge and blocks divided by the second lateral grooves;

each of the blocks includes only a pair of the lateral sipes and only one longitudinal sipe;

the second land region is defined between the first main groove and the first tread edge;

each of the second lateral grooves extends so as to connect the first main groove and the first tread edge;

the longitudinal sipe is not connected with the second lateral grooves;

each of the second lateral grooves includes a narrow portion connected with the first main groove, a wide portion disposed on the axially outer side of the narrow portion and having a larger groove width than that of the narrow portion, and an middle portion disposed between the narrow portion and the wide portion; and the longitudinal sipe is provided on the axially outer side of the narrow portion, and in each of the second lateral grooves, one of groove walls extends linearly over the narrow portion and the middle portion.

17. A tire comprising:

a tread portion having a tire equator and a first tread edge, the tread portion being provided with a first main groove extending continuously in a tire circumferential direction between the tire equator and the first tread edge and a first land region disposed adjacently to the first main groove on a first side in a tire axial direction farther away from the first tread edge;

the first main groove comprising a first groove wall located on a second side in the tire axial direction closer to the first tread edge and a second groove wall located on the first side, the first groove wall being provided with a plurality of first recessed portions recessed toward the second side and arranged in the tire circumferential direction, the second groove wall being provided with a plurality of second recessed portions recessed toward the first side and arranged in the tire circumferential direction; and the first land region being provided with a plurality of first lateral grooves;

wherein each of the first lateral grooves comprises a first portion connected with the first main groove so as to form an opening on the first main groove and a second portion disposed on the first side in the tire axial direction of the first portion and having a groove width smaller than that of the first portion;

at least a part of the opening of the first portion of at least one of the first lateral grooves faces one of the first recessed portions in the tire axial direction, and if the opening is virtually extended toward the first recessed portion along the tire axial direction, at least a part thereof overlaps with the first recessed portion;

the second recessed portions are not connected with the first lateral grooves;

the first land region is provided with a plurality of sipes extending along the first lateral grooves wherein each of the sipes extends in an arc shape over its entire length;

the first land region is adjacent to the first main groove on the inner side in the tire axial direction;

the tread portion is provided with a second main groove extending continuously in the tire circumferential direction between the first main groove and the tire equator and defining the first land region between the first main groove and the second main groove, and a third land region adjacent to the second main groove on the inner side in the tire axial direction;

each of the first lateral grooves is connected with the second main groove;

the third land region is provided with a plurality of lug grooves extending axially inwardly from the second main groove and terminating within the third land region to each have a closed terminating end;

at least one of the lug grooves is provided on one of extended lines obtained by virtually extending the first lateral grooves axially inwardly according to shapes of the first lateral grooves;

the third land region provided with a plurality of sipes crossing the third land region; and the sipes of the third land region are inclined to the opposite direction to the lug grooves.

* * * * *